(12) United States Patent
Haynes

(10) Patent No.: US 6,860,029 B2
(45) Date of Patent: Mar. 1, 2005

(54) LENGTH ADJUSTABLE TOOL FOR ALIGNING BORING BAR

(76) Inventor: George C. Haynes, 8724 Rutledge Pike, Knoxville, TN (US) 37924

( * ) Notice: Subject to any disclaimer, the term of this patent is extended or adjusted under 35 U.S.C. 154(b) by 0 days.

(21) Appl. No.: 10/462,891

(22) Filed: Jun. 17, 2003

(65) Prior Publication Data

US 2004/0255481 A1 Dec. 23, 2004

(51) Int. Cl.$^7$ .............................................. E21B 47/02
(52) U.S. Cl. .............................. 33/645; 33/613; 33/809; 33/302
(58) Field of Search ......................... 33/645, 613, 809, 33/302, 304, 464, 813, 600, 606, 810, 811, 814, 818

(56) References Cited

U.S. PATENT DOCUMENTS

| | | | |
|---|---|---|---|
| 292,409 A * | 1/1884 | Carleton ...................... | 33/813 |
| 488,281 A * | 12/1892 | Lavigne ...................... | 33/813 |
| 2,677,894 A * | 5/1954 | Belgard ...................... | 33/811 |
| 4,280,281 A * | 7/1981 | Gerber ........................ | 33/613 |
| 4,320,577 A * | 3/1982 | Lauritzen .................... | 33/613 |
| 4,393,596 A * | 7/1983 | Gerber ........................ | 33/613 |
| 4,559,716 A * | 12/1985 | Daughtry et al. ............ | 33/613 |
| 5,299,609 A * | 4/1994 | Wedler ........................ | 33/613 |
| 6,272,766 B1 * | 8/2001 | Tondorf et al. .............. | 33/809 |
| 6,460,268 B1 * | 10/2002 | Hoefer ........................ | 33/645 |
| 6,490,806 B1 * | 12/2002 | Stone .......................... | 33/613 |
| 6,550,156 B1 * | 4/2003 | Scoville ...................... | 33/809 |
| 6,658,753 B2 * | 12/2003 | Tatarnic ...................... | 33/613 |

* cited by examiner

*Primary Examiner*—Diego Gutierrez
*Assistant Examiner*—Travis Reis
(74) *Attorney, Agent, or Firm*—Pitts & Brittian, P.C.

(57) ABSTRACT

An alignment tool for adjustably positioning a boring bar relative to a spaced apart fixed location on a structural member including an elongated bar formed of a plurality of axially aligned and separable tubular members and having its opposite ends mounted to the boring bar and the fixed location, respectively. The length of the bar, hence the distance between the boring bar and the fixed location is adjustably selectable by means of telescopically mounted one of the tubular members. A first one of the tubular members receives therein a second one of the tubular members employing a thread interconnection whereby rotational movement of one tubular member relative to the other provides selection of the overall length of the tool. Multiple indicia associated with the outer circumference of each of the threadably interconnected tubular members provide a visual indication of the extent of the insertion of said second tubular member within said first tubular member, hence the overall length of the tool.

17 Claims, 7 Drawing Sheets

LENGTH ADJUSTABLE TOOL FOR ALIGNING BORING BAR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to apparatus for boring of a new hole or reboring of an existing hole in a workpiece wherein the new hole or the hole to be rebored is spaced apart from a different hole or other location on the workpiece. That is, the workpiece may exist with two holes therein, one or both of which need to be rebored, or the workpiece may have a first hole and may need a second hole bored in the workpiece at a location which is to be precisely spaced-apart from the first hole. Commonly, the present invention is employed in combination with a portable boring bar.

U.S. Pat. No. 5,785,466 (the '466 patent) discloses a tool for aligning a portable boring bar for reboring one or more existing holes in a workpiece. As disclosed in the '466 patent, the need for the aligning tool is frequently found when repairing heavy earth-moving type machinery which employs articulating joints as a part of the machine. The '466 patent is incorporated herein in its entirety by reference.

As pointed out in the '466 patent, in many applications, the points of articulation include multiple bores. In substantially all instances, the articulating joint includes two structural items, one of which is articulated relative to the other item, and each structural item has its own set of bores. The bores of a first set are disposed in a first structural member of the machine and the second set of bores are disposed in a second structural member of the same machine. For articulation of the first and second structural members, the bores in one set must be in register with the bores of the second set and some form of pin or other removable connector passed through the registered bores to define the articulation joint. Thus, the axes of the bores of a first set must be parallel to one another, must be perpendicular to an outer surface of their structural member, and spaced apart by a precise distance. Likewise, the axes of the bores of the second set must be parallel to one another and perpendicular to an outer surface of their structural member, and spaced apart from one another by a precise distance, such distance being precisely equal to the distance separating the bores of the first set.

The present inventor has found that it is also of importance that, when reboring a bore it is most important that the axis of the resultant rebored bore not only be parallel to the axis of a second (or base) bore, but the distance between the axis of the base hole and the axis of the rebored bore be spaced apart by a very precise distance. Failure to form the bores of a first set of holes in a first structural item with their axes both parallel to one another and precisely spaced apart, and to form the holes of the second set of holes in a second structural item with their axes both parallel to one another and precisely spaced apart by the same distance at which the holes in the first set are spaced apart, results in failure of the rebored hole and the base hole of the first set of holes in the first structural item to line up (be in register) with matching holes in a second set of holes in the second structural item. This misalignment of the bores can result in malfunctioning of the articulation action of the joint.

By "precisely", it is meant that the distance between any two holes of a set should be equal to the desired spacing ±0.01 inch or better. The significance of this degree of precision will be recognized when one notes that the structural items involved in the articulating joint of a piece of heavy duty earth moving machinery weighs hundreds of pounds and are relatively huge in bulk, hence they must be manipulated by a crane or other mechanical lifting and positioning device when being assembled. Accordingly, failure to provide precisely positioned and parallel holes (bores) in both of the structural elements may completely preclude the joining of the articulating structural elements, or may result in improper alignment of these elements and resulting undue wear of the holes due to their misalignment. Also, importantly, when assembling the heavy and huge structural items, a worker's manual attempts to move or rearrange the structural items to align their respective sets of holes can be frustrating, but more importantly, can result in serious injury to the worker.

Accordingly, there is a need in the industry for a tool which is capable to aligning first and second holes, with their respective axes being parallel to one another and precisely spaced apart from one another.

BRIEF SUMMARY OF THE INVENTION

In accordance with one aspect of the present invention, there is provided an alignment tool for use in the precise alignment of at least a first hole in a structural member of an item of heavy duty machinery relative to a second hole or other location on the structural member. The alignment tool of the present invention includes at least a first hollow tubular segment which houses centrally thereof a rigid externally threaded rod which is anchored to one end of the first segment and extends in cantilevered fashion from its anchored location along substantially the entire length of the first segment, and a second hollow tubular segment telescopically received within the first tubular segment. The second segment circumscribes the internal rigid rod of the first segment and includes an internally threaded plug in that end of the second segment which is received within the first segment, such plug acting as a lead nut threaded onto the rigid rod. The depth of insertion of the second tubular segment within the first tubular segment is selectable by rotation of the second segment relative to the first segment to adjust the overall length of the alignment tool. Venier means is provided to visually observe and thereby select the overall length of the alignment tool to within about 0.01 inch increments. The opposite outboard ends of the first and second tubular segments, preferably are provided with tubular extensions thereof which are provided with receptors for releasably anchoring the receptors to, and extending between, first and second elements of a portable boring bar, for example, to precisely establish the separation distance of such elements of the boring bar, hence the separation distance of a hole to be bored or rebored from a spaced-apart location relative to the hole. The alignment tool is particularly useful in combination with the tool disclosed in U.S. Pat. No. 5,785,466.

DETAILED DESCRIPTION OF THE INVENTION

Figure 9:
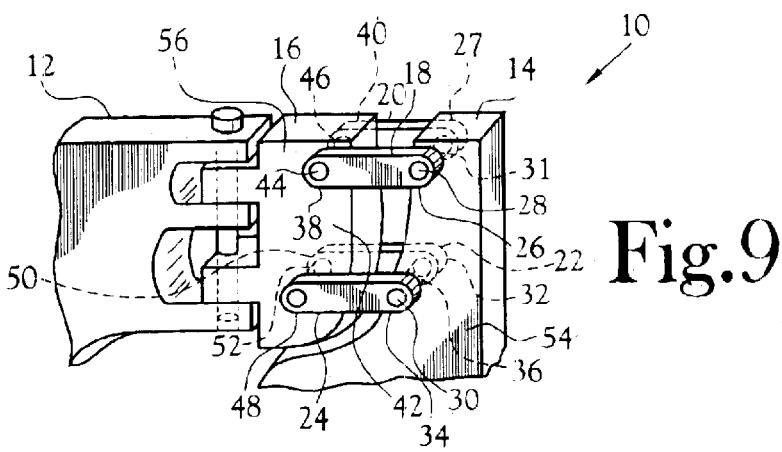
FIG. 9 is a representation of an articulation joint between first and second structural members of a typical earth-moving machine.

A typical articulating joint 10 found in a heavy duty earth-moving machine, such as a common tractor-pulled pan, is depicted in FIG. 9 and includes a first structural hitch member 12 associated with the rear end of the tractor, a second structural hitch member 14 associated with the front end of the pan, and a third structural hitch member 16 interposed intermediate the first and second elements. These first and third hitch members are connected in articulating relationship by first, second, third and fourth connector strips 18,20,22,24. Typically, a first end 26,27 of each of the first and second connector strips 18,20 are rotatably pinned by a pin 28 which passes through a first hole (bore) 31 through the thickness of the second hitch member 14 associated with the pan. In like manner, the first end 32,34 of each of the third and fourth connector strips 22,24 are pinned by a pin 30 which passes through a second hole (bore) 36 through the thickness of the second hitch member associated with the pan, the axes of the first and second holes 31,36 being both parallel and spaced-apart from one another by a precise distance.

The opposite ends 38,40 of the first and second connector strips are pinned to the trailing margin 42 of the third hitch member 16 by a pin 44, which passes through a hole 46 through the thickness of the third hitch member. In like manner, the opposite ends 48,50 of the third and fourth connector strips 22,24 are pinned by a pin 52 to the trailing margin 42 of the third hitch member. The axes of these holes 36,52 are both parallel and spaced apart from one another by a precise distance. Moreover, desirably, the axes of the holes 31,32 through the second hitch member 14 are parallel to one another and are also aligned perpendicular to the outer face 54 of the second hitch member. In like manner, the axes of the holes through the third member are also aligned perpendicular to the outer face 56 of the third hitch member. Thus, when the outer faces 54,56 of the second and third members are planarly aligned, the axes of the holes through the second member and the axes of the holes through the third member are aligned parallel to one another, thereby making assembly of the second and third hitch members to one another a relatively easy, task.

Figure 10:
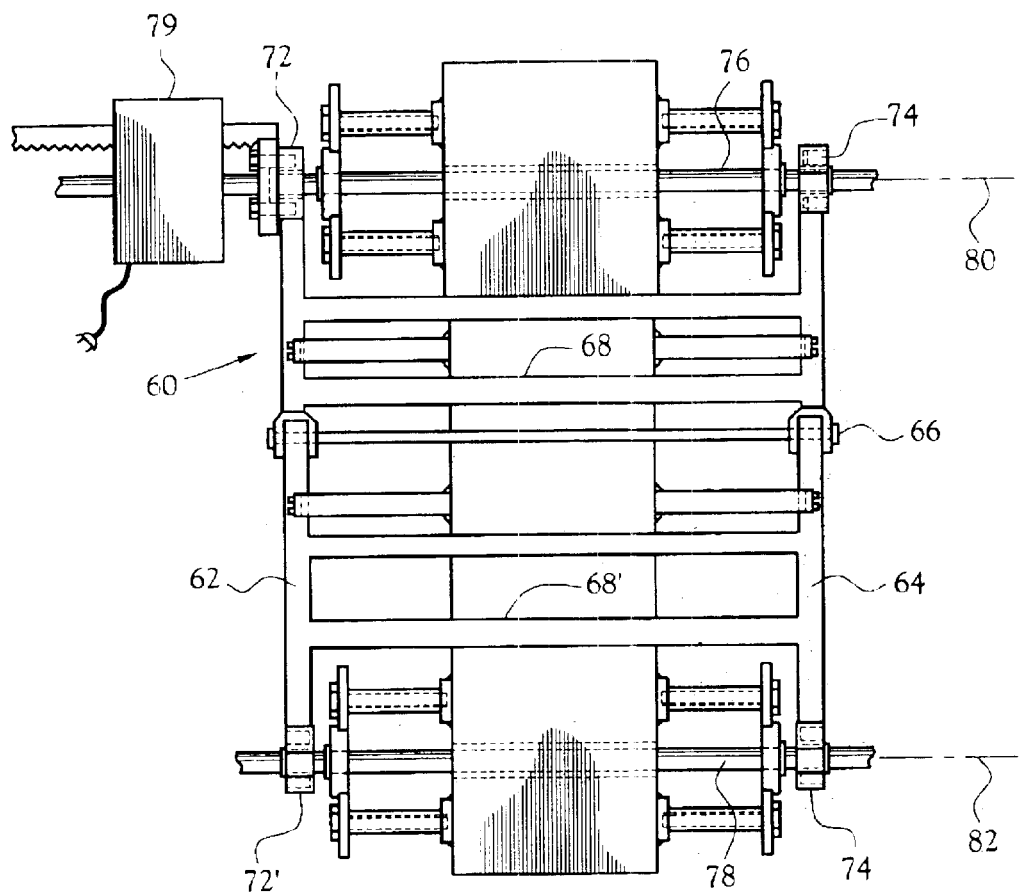
FIG. 10 is a top plan view of a tool designed to position a portable boring bar as described in U.S. Pat. No. 5,785,466; and, FIG. 11 is a representation of one embodiment of a tool of the present invention as employed in combination with an tool designed to mount a portable boring bar.
Figure 11:
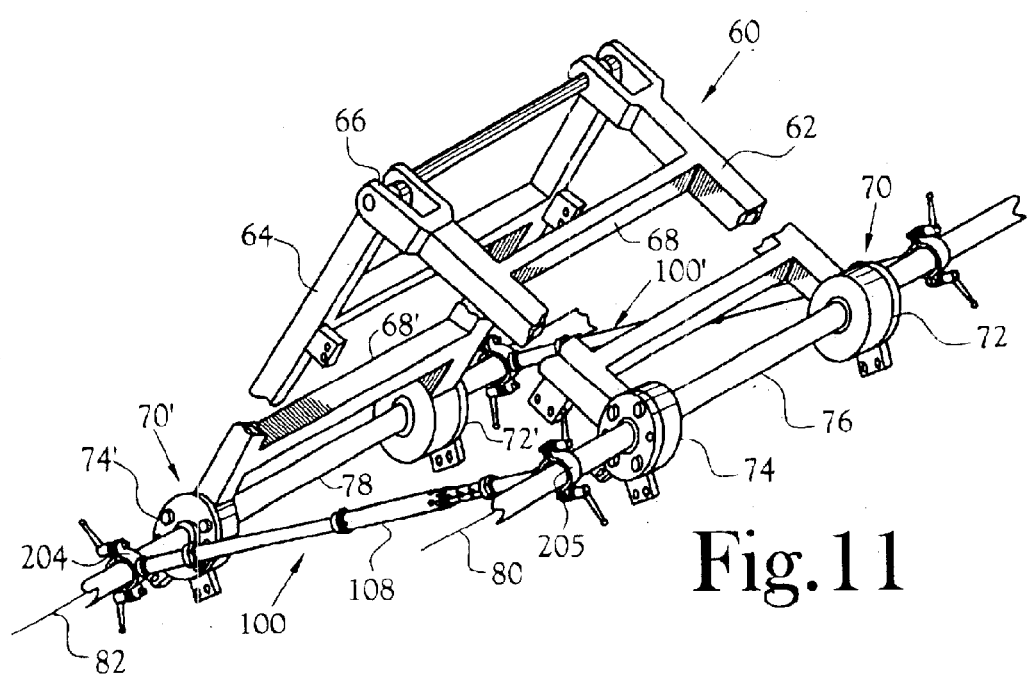

In FIGS. 10 and 11, there is depicted one embodiment of a boring bar mounting tool 60 as disclosed in the '466 patent. As disclosed in the '466 patent, this tool is designed to be mounted on the outer face of a structural element to permit either reboring of an existing hole through the thickness of the structural element or to bore a new hole through the thickness of the structural element, in either event, the rebored hole or the new hole is to be spaced-apart a precise distance from an existing hole. Among other elements, the tool depicted in FIGS. 10 and 11 includes first and second side elements 62,64, each of which is hinged approximately centrally 66 thereof. The first and second side elements are rigidly interconnected parallel and spaced-apart from one another by multiple cross members 68,68' (typical). Each side member includes a first end 70 (FIG. 11) which-defines a first set generally cylindrical mountings 72,74 for rotatably receiving therein a boring bar 76 and a second end 70' which defines a second set of generally cylindrical mountings 72'74' for rotatably receiving therein a rigid alignment bar 78. The boring bar is rotatably driven about its longitudinal axis or by a portable motor 79.

In FIGS. 10 and 11, it is noted that a straight rigid boring bar 76 is fed through the mounts 72 and 74 on the first end of the side members of the mounting tool. In like manner, a straight rigid alignment bar 78 is fed through the mounts 72' and 74' on the second end of the mounting tool. It will be recognized from FIGS. 10 and 11 that the longitudinal axes 80,82 of these two rigid straight bars provide loci for the establishment of the distance between such two bars; hence establishment of the distance between the axis of a first hole (into which one end of the alignment bar is inserted) and a second hole to be rebored, or the location of the axis of a new hole to be bored by the boring bar 76 all as more fully described in the '466 patent.

Accordingly, in accordance with one aspect of the present invention, there is provided a length-adjustable alignment tool 100 for the setting and retention of the separation distance between the boring bar and the alignment bar of a tool, such as that disclosed in the '466 patent, for example.

Figure 1:
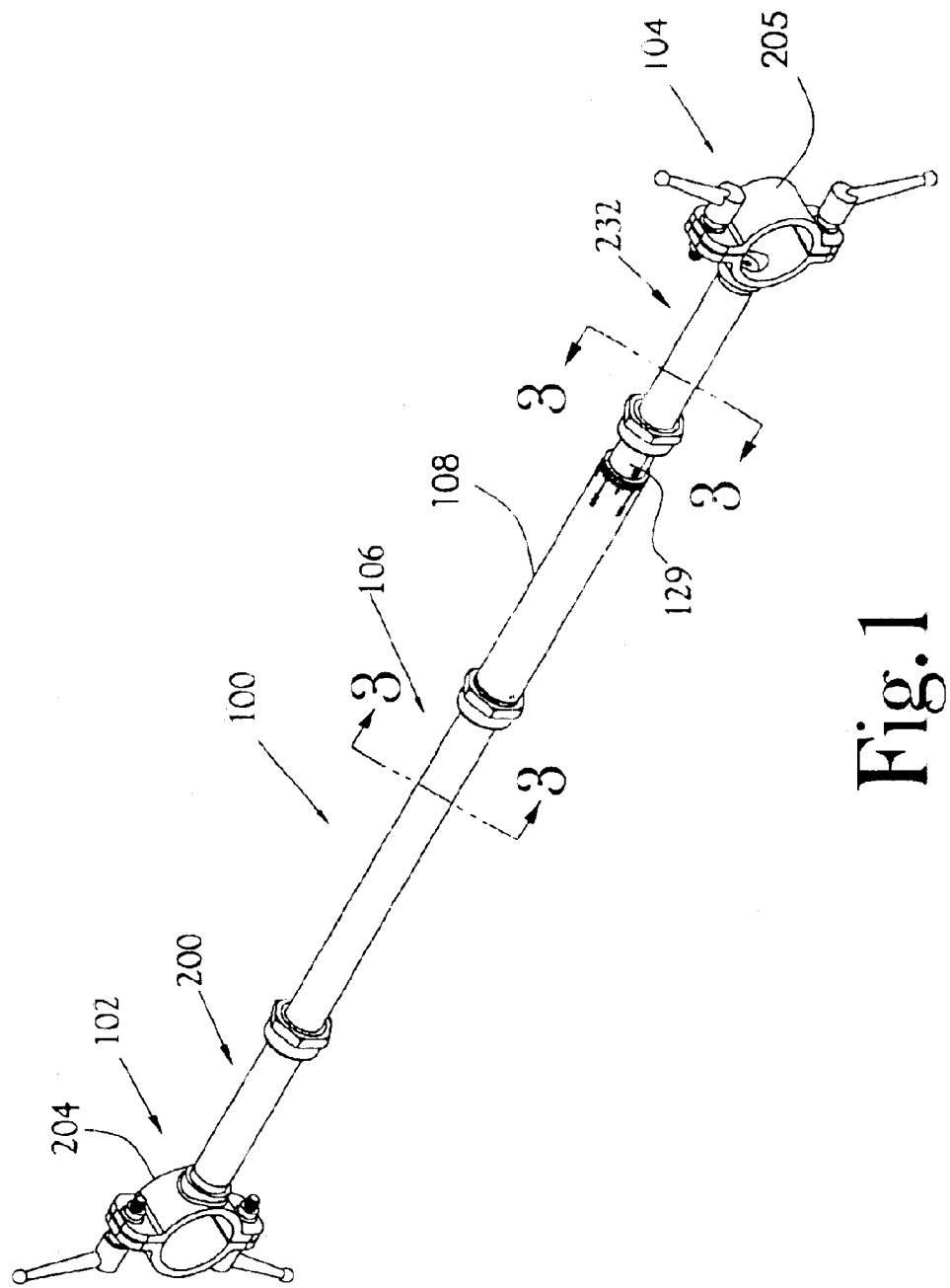
FIG. 1 is a representation of a tool embodying various of the features of the present invention.

Referring to FIG. 1, there is depicted one embodiment of an adjustment tool 100 of the present invention.

The depicted tool generally includes a first end 102 adapted to be attached to a boring bar, for example, and a second and opposite end 104 adapted to be attached to an alignment bar and a central body portion 106 interposed between the opposite ends.

Figure 3:
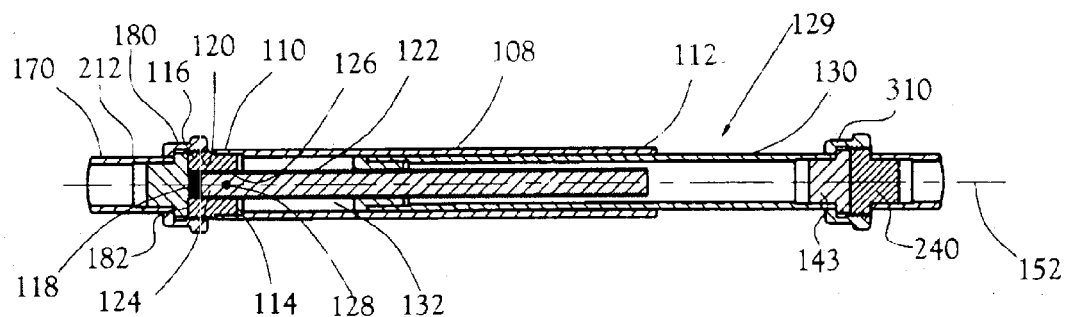
FIG. 3 is a cross-sectional, side elevation, view of a portion of the tool depicted in FIG. 1 and taken generally along the line 3—3 of FIG. 1 and depicting first and second telescoping tubular elements.

Referring specifically to FIGS. 1 and 3, the central body portion 106 of the depicted embodiment of the tool includes a first rigid hollow tubular segment 108 having a first (outboard) end 110 and a second (inboard) end 112. The first (outboard) end 110 of the segment is closed by a shouldered sleeve 114, such shoulder abutting the circumference of the end of the segment 108 and limiting the extent of insertion of the sleeve into the segment. The sleeve 114 is anchored within the end of the tube as by press fitting, threading or other equivalent and suitable anchoring technique. The shoulder 116 of the sleeve 114 is centrally bored 118 and provided with threads 120 on its outer circumference.

Figure 4:
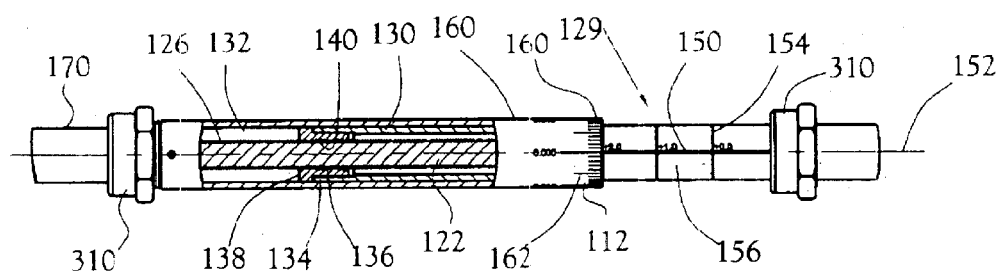
FIG. 4 is a further side elevation view of a portion of the tool taken generally along line 3—3 of FIG. 1 and depicting a cutaway of a portion of said tool.

As depicted in FIGS. 3 and 4, a rigid externally threaded rod 122 is disposed within the interior of the first segment 108. A first end 124 of the rod is threaded 126 into the internally threaded bore 118 of the plug 114 and pinned against lateral rotational or longitudinal movement relative to the plug 114, hence relative to the first segment 108, as by a roll pin 128. This rod extends coaxially along substantially the entire length of the first segment in cantilevered fashion and terminates short of the second end 112 of the first segment.

Figure 5:
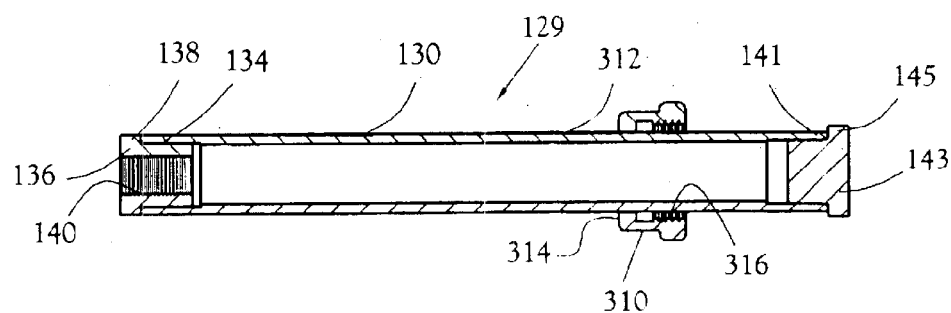
FIG. 5 is a side elevational view, in cross-section of the right hand tubular element of FIG. 3.

A second segment 129 of the central body portion 106 of the present tool comprises a rigid hollow tube 130 having an outer diameter suitable to permit the tube to snugly, but readily slidably, be received within the interior 132 of the first segment 108. Referring specifically to FIGS. 3, 4 and 5, this second tubular segment 129 includes a first (inboard) end 134 which receives therein a shouldered sleeve 136. The shoulder 138 abuts the circumference of the end 134 and functions to limit the extent of insertion of the sleeve into the interior of the inboard end 134 of the second segment. The sleeve is anchored within the end of the second segment by press fitting or other suitable means which ensures that the sleeve is secured within the second segment and is fixed against rotational movement relative to the second segment. Further, the sleeve is provided with internal threads 140 which are complementary with the external threads 126 on the cantilevered rod 108 so that telescopic insertion of the second segment into the first segment is effected by rotation of the second segment relative to the first segment by means of the internally threaded sleeve functioning as a lead nut threaded onto the externally threaded rod 122 held fixedly in the first segment.

As seen in FIGS. 3 and 5, the outboard end 141 of the second segment 129 is fitted with a shouldered plug 143. The shoulder 145 of the plug projects axially outwardly beyond the outer circumference of the body portion 312 of the second segment. As depicted FIG. 4, the external circumference of the second segment is marked with a straight line 150 which is parallel to the longitudinal axis 152 of the second segment and which is located on the exterior circumference of the second segment in ready visible accessability to a user of the tool. Moreover, this line is intersected at equally spaced locations along its length, for example, one inch increments, by lines 154 (typical) on the outer circumference of the second segment and which are oriented perpendicular to the longitudinal line 150. These lines function to visually divide the length of the second segment into equal divisions 156 (typical) useful in visually observing the extent of telescopic insertion of the second segment into the interior of the first segment. Further, as seen in FIG. 4, the circumferential margin 160 of the outboard end of the first segment is provided with equally spaced apart lines 162 (typical) which, in combination with the longitudinal line on the outer circumference of the second segment, serve as indicia of the extent to which a given division 156 of the second segment is inserted into the interior of the first segment. Preferably, the spacing between adjacent ones of the lines 162 on the outer circumference of the end 112 of the first segment is chosen such that the total of all such spacings is equal to the length of each division 156 defined on the second segment, in the form of a micrometer-type measurement, thereby providing for precision selection of the extent of telescopic insertion of the second segment into the first segment, hence defining a means by which the overall length of the tool can be selected very precisely.

As desired, the outboard end 110 of the first tubular segment 10 may be provided with one or more tubular extension segments 170 which are joined in axial alignment with the longitudinal axis 152 of the first and second segments.

Figure 8:
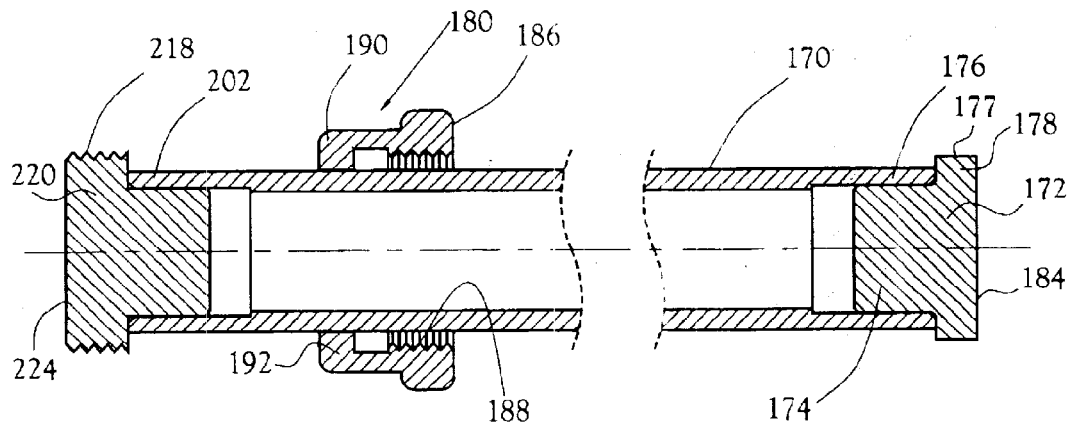
FIG. 8 is a side elevational view, in cross-section of an extension segment in association with an embodiment of the present invention.

Referring to FIG. 8, the inboard end of the first extension segment 170, is closed by a shouldered plug 172 whose body portion 174 is press fitted into the open inboard end 176 of the extension segment. The diameter of the shoulder 178 of the plug 172 is greater than the outer diameter of its extension segment 170 so that a circumferential portion 177 of the shoulder of the plug projects axially past the outer circumference of the inboard end 176 of the segment 170. A tubular lock nut 180 is provided in encircling relationship to the outer circumference of the first extension segment 170 to effect releasable joinder of abutting end face 182 of the sleeve 114 in the outboard end of the first segment and the face 184 of the plug 174 inserted in the inboard end of the first extension segment. As depicted in FIG. 8, one end 186 of the tubular lock nut 180 includes internal threads 188 which are complementary to the external threads 120 on the circumferential flange of the sleeve 114 disposed in the outboard end of the first segment so that the lock nut may be threadably joined to the sleeve 114. The opposite end 190 of the lock nut 180 includes an axially inwardly directed flange portion 192 which engages the axially outwardly projecting shoulder 178 on the plug 172 which is fixedly held within the inboard end 176 of the first extension segment. Thus, it will be recognized that by threading the lock nut onto the sleeve 114, the abutting faces of the sleeve 114 and the plug 172 in the inboard end of the first extension sleeve are pulled together and held against either separation or movement relative to one another.

Figure 7:
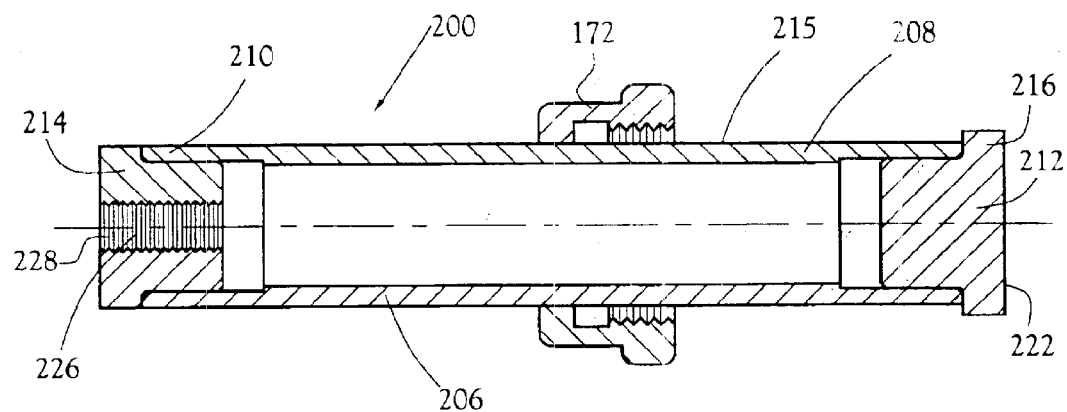
FIG. 7 is a side elevational view, in cross-section, of a further clamp post member interposed between the left-hand end clamp and an adjacent one of the first and second tubular members depicted in FIG. 3.

In the depicted embodiment of FIG. 7, the tool of the present invention is provided with a second rigid tubular clamp post 200 which functions to fixedly secure the outboard end 110 of the first extension segment 170 to a first end clamp 204. Specifically, this second clamp post, in one embodiment, comprises a rigid hollow tube 206, the first (inboard) and second (outboard) ends 208,210 of which are fitted with respective shouldered plugs 212 and 214. In the embodiments depicted in FIG. 7, the shoulder 216 of the plug 212 disposed within the inboard end 208 of the tube 206 projects axially beyond the outer circumference of the body portion 215 of the tube, whereas the outer circumference of the plug 214 which is disposed within the outboard end 210 of the tube is flush with the outer circumference of the tube. The body portion 215 of the tube is circumscribed by a lock nut 172 (see also FIGS. 3 and 4) adapted to threadably engage external threads 218 on a plug 220 disposed in the outboard end 202 of the first extension segment 170 and the axially outwardly projecting portion of the circumference of the shoulder 216 of the plug 212 to draw the outer faces 222,224 of the plugs 212 and 220, respectively, snugly together to fixedly secure the first clamp tube in axial alignment with the first extension segment 170. The plug 214 disposed in the outboard end 210 of the first clamp tube 200 is centrally bored 226 and provided with internal threads 228.

Figure 6:
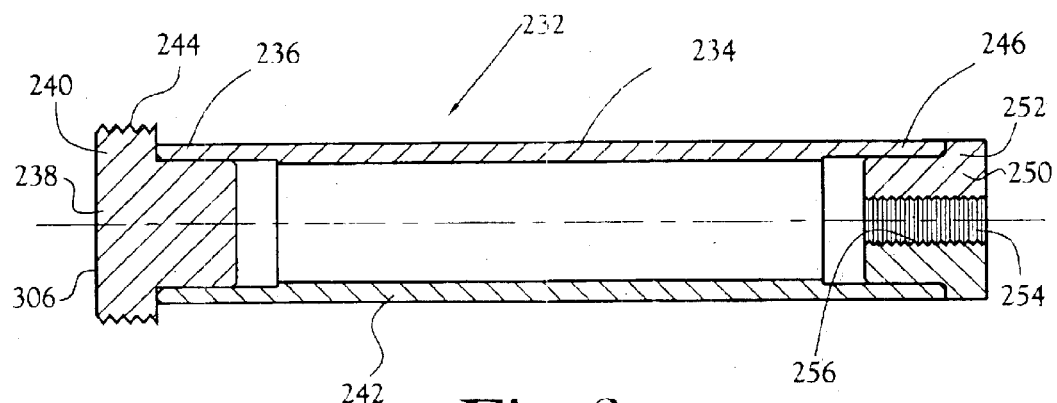
FIG. 6 is a side elevational view, in cross-section, of a clamp post interposed between the right-hand end clamp and an adjacent one of the first and is second tubular members depicted in FIG. 3.

As depicted in FIG. 6, in one embodiment, there is provided a first clamp post 232 which comprises a rigid, hollow, tube 234 having its first (inboard) end 236 fitted with a shouldered plug 238, the shoulder 240 thereof projecting radially beyond the outer circumference of the body portion 242 of the tube and being provided with external threads 244 on its outer circumferential surface. The second (outboard) end 246 of the first clamp post 232 is fitted with a shouldered plug 250, the outer circumference of the shoulder 252 being flush with the outer circumference of the tube. This plug is axially bored 254 and provided with internal threads 256.

Figure 2:
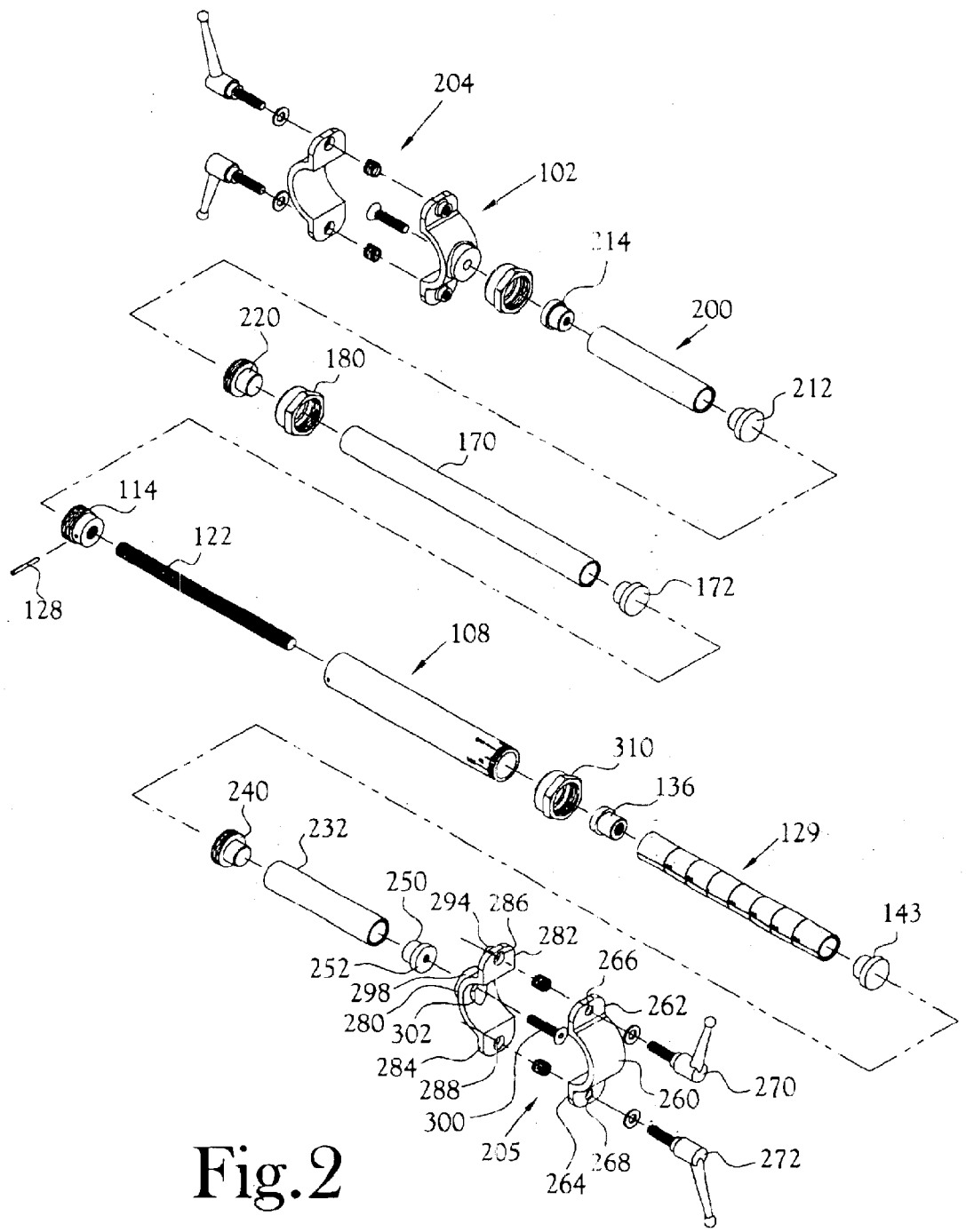
FIG. 2 is an exploded representation of the tool depicted in FIG. 1.

Referring to FIGS. 1 and 2, each of the opposite ends 102,104 of the tool of the present invention includes a clamp 204,205 which is adapted to engage and grasp either a boring bar or an alignment bar of a portable boring bar, for example. To this end, each of these clamps, 205 for example, comprises a top clam shell half 260 having lugs 262,264 projecting radially therefrom on diametrically opposite sides thereof, each of the lugs being bored 266,268 for receipt therein of threaded fasteners 270 and 272. Each clamp further includes a bottom clam shell half 280 which also has lugs 282,284 projecting radially therefrom on diametrically opposite sides thereof and which are bored 286,288 for the receipt of the aforesaid fasteners 270,272 therethrough. The lugs 282,284 of the bottom clam shell half 280 may be straight bored, in which case nuts 294 (typical) are employed in combination with the fasteners to draw the two clam shell halves together and in engagement with a boring bar or an alignment bar disposed between the halves. Alternatively, the bores through the lugs on the bottom clam shell half may be threaded to threadably receive the fasteners therein. The bottom clam shell half, in the depicted embodiment, is provided with a short post 298 centrally thereof which projects outwardly from the bottom clam shell to abuttingly engage the outer face 252 of the plug 250 disposed within the outboard end of the clamp post 232. Securement of the bottom clam shell half to the clamp post is provided by means of a bolt 300 which is threadably fed through a central threaded bore 302 in the post, thence into the internally threaded bore 254 in the plug 250 in the outboard end of the clamp post.

As seen in FIG. 7, the inboard end 236 of the clamp post 232 which is associated with the second segment 129 of the tool is releasably connected to the inboard face 306 of the inboard shouldered plug 240 in the inboard end 236 of the clamp post 232. In the embodiment of the invention depicted in FIG. 6, the inboard end 236 of the clamp post 232 associated with the second segment 129 of the tool, includes a shoulder 240 having threads 244 on its outer circumferential surface. In this embodiment, a lock nut 310 is provided in circumscribing relationship to the body portion 312 of the second segment 129 with its radially inwardly projecting shoulder 314 engaging the outwardly projecting shoulder 145 of the plug 143 disposed within the outboard end 141 of the second segment 129 and with its internal threads 316 on its opposite end engaging the threads 244 on the outer circumference of the shouldered plug 238 which is fitted in the inboard end 236 of the clamp post 232. This releasable joinder of the abutting ends of the second segment and the clamp post is important in the present invention inasmuch as it will be recognized that, in use, when the lock nut 310 is tightened to draw the ends of the second segment and the clamp post together, these components become rigid with one another, both axially and rotationally. On the other hand, when the lock nut is loosened, the second segment will remain axially aligned with the clamp post, but may readily be rotated relative to the clamp post and relative to the first segment within which the second segment is received.

As depicted in FIG. 6, in use, after the end clamps 204,205 have been affixed to their respective ones of the boring bar 76 and the alignment bar 78 of the portable boring tool 60, by rotating the second segment relative to the first segment, one can adjust the overall length of the alignment tool within the range afforded by the distance which the body portion of the second segment can enter or exit the interior length of the first segment. This distance can be preselected over a large range, but one example is about 20 inches. To this end, the precision with which the overall length of the alignment tool can be adjusted is enhanced by means of the vernier markings provided on the outer circumference of the end of the first and second segments of the tool. In the depicted embodiment, there are indicia 100 disposed equidistantly apart about the outer circumference of the end 112 of the first segment 108. Along the length of the outer circumferential surface of the body portion of the second segment 129, the longitudinally aligned line 150 provides a "zero" line which serves as a base line from which the readings are taken from the indicia 100 on the outer circumference of the first segment. By this means, one can readily adjust the overall length of the alignment tool to a precision of 0.001 inch or better.

Clamping of the second end of the present tool to a respective one of the boring bar and alignment bar of the portable boring bar, for example, is effected in like manner as described hereinabove for clamping of the first end of the tool to a boring bar or alignment bar. One difference between the clamping of the first and second ends of the tool is that when clamping the second end to its respective bar, the clamp post employed includes a non-threaded shouldered plug in the inboard end of the clamp post to facilitate assembly of the several elements of the present tool.

The present alignment tool is readily applied to a portable boring bar, for example, and easily and precisely adjusted in length after the alignment tool has been applied to the portable boring bar by reason of the selective rotational mounting of the second segment relative to the first segment and the clamp post 232. As depicted in FIG. 11, as desired, a length adjustment tools 100, 100' of the present invention preferably are employed on opposite sides of a boring bar.

Notably, each of the first and second segments, any extension segments, and/or clamp posts may be selected of any desired length, thereby increasing the versatility of the tool. Preferably each of these elements of the tool are fabricated of a metal.

Whereas the present invention has been described in specific terms and examples, it will be recognized by one skilled in the art that various modifications may be made in the structural make-up of the tool without departing from the invention. For example, whereas one or more of the hollow tubular segments, clamp posts and/or extensions may be formed from solid rods which are end bored to provide for interconnection of these elements with or without employing complementary threads between adjacent elements of the tool.

What is claimed:

1. An elongated alignment tool for a boring bar or like device used to bore or rebore a hole into or through a structural member at a location spaced apart from a further hole or location on the structural member comprising:

at least a first hollow tubular segment having outboard and inboard ends, said first tubular segment being non-rotatably anchored to a further hole or location on the structural member, a second hollow tubular segment having outboard and inboard ends, said inboard end being telescopically received within said first hollow tubular segment, a rigid externally threaded rod having first and second ends, said first end of said rod being fixedly anchored internally of said inboard end of said first tubular segment and extending in cantilevered fashion along substantially the full length of said first tubular segment, said second hollow tubular segment including a plug fixedly mounted internally thereof adjacent said inboard end thereof and including an internally threaded throughbore therethrough and threadably engaging said externally threaded rod whereby rotation of said second tubular segment relative to said first tubular segment effects telescopic movement of said second segment relative to said first tubular segment, a first elongated clamp post having outboard and inboard ends, said outboard end being adapted to be releasably and non-rotatably anchored to the boring bar, and said inboard end adapted to be selectively either fixedly anchored to said outboard end of said second segment to preclude rotation of said first clamp post relative to said second segment or loosely affixed to said outboard end to permit rotation of said first clamp post relative to said second segment, whereby rotation of said second segment relative to said first segment effects lengthening or shorting of the overall length of the elongated alignment bar.

2. The alignment tool of claim 1 and including a second clamp post having outboard and inboard ends interposed between said inboard end of said first tubular segment and a further hole or location on the structural member, said second clamp post including means for releasably non-rotatable anchoring of said second clamp post to said further hole or location on the structural member, including means for releasably fixedly engaging said inboard end of said second clamp post to said inboard end of said first tubular segment to thereby secure said first tubular segment non-rotatable relative to said further hole or location on the structural member.

3. The alignment tool of claim 2 and including a third tubular extension segment interposed between said second clamp post and said first tubular segment.

4. The alignment tool of claim 1 and including multiple indicia disposed in spaced apart relationship to one another on the outer circumference of said outboard end of said first tubular segment, and a visible straight line indicator disposed on the outer circumference and aligned with the length dimension of said second tubular segment whereby rotation of said second segment relative to said first segment is visibly observable as a function of the movement of said straight line indicator on said second segment relative to said circumferentially disposed indicia on said first segment.

5. The alignment tool of claim 4 and including multiple indicia disposed about the outer circumference of and equidistantly spaced apart along the length of said second segment, said multiple indicia each being oriented perpendicular to said straight line indicator on said second segment.

6. The alignment tool of claim 4 wherein the spacing between said indicia on said outboard end of said first segment in combination with said indicator and said further indicia on said segment provide a visible indication of the degree of telescopic insertion of said second segment within said first segment to a precision of at least about 0.01 inch.

7. The alignment tool of claim 1 wherein said inboard end of said first clamp post includes a circumferential flange projecting radially outward of said inboard end and including external threads thereon, and a lock nut disposed in encircling relationship about said second segment and adapted to threadably engage said threads on said circumferential flange and selectively secure said second segment in either a non-rotatable or rotatable relationship relative to said first clamp post.

8. The alignment tool of claim 7 wherein said first clamp post includes a plug having a circumferential flange projecting radially outwardly of said outer circumference of said clamp post and being fixedly secured within the inboard end of said first clamp post.

9. An alignment tool for adjustably positioning a boring bar relative to a spaced apart fixed location comprising an elongated bar of adjustable length and having first and second ends, means for releasably affixing said first end of said bar to the boring bar, means for releasably affixing said second end of said bar to the fixed location, length adjustment means disposed along the length of said bar and between said first and second ends thereof, said length adjustment means including a first elongated hollow tubular member having first and second opposite ends and a longitudinal axis, a second elongated tubular member having a longitudinal axis telescopically disposed at least partially within said first tubular member, means securing said first tubular member against rotation thereof about its longitudinal axis, means securing said second tubular member for selective rotation about its longitudinal axis relative to said first tubular member whereby more or less of the length of said second tubular member is disposed within said first hollow tubular member as a function of the direction of rotation of said second tubular member about its longitudinal axis relative to said first hollow tubular member, multiple indicia associated with the outer circumference of each of said first and second tubular members and providing a visual indication of the extent of the insertion of said second tubular member within said first tubular member.

10. The alignment tool of claim 9 wherein said means securing said second tubular member for selective rotation about its longitudinal axis includes a clamp post having a longitudinal axis and first and second ends, said first end of said clamp post being anchored to one of a boring bar or a fixed location spaced from the boring bar, said second end of said clamp post abutting said first end of said second tubular member with their respective longitudinal axes in register, and adjustable means joining said abutting ends of said clamp post and said second tubular member for selective rotation or non-rotation of said second tubular member relative to said clamp post.

11. The adjustment tool of claim 10 wherein said adjustable means joining said abutting ends of said clamp post and said second tubular member comprises a lock nut.

12. The adjustment tool of claim 9 wherein said second tubular member is hollow, said first hollow tubular member includes an elongated guide rod having first and second opposite ends disposed internally of said first hollow tubular member with its first end fixedly anchored adjacent said first end of said first tubular member and extending therefrom along the length of said first tubular member to be slidably received internally of said hollow second tubular member, whereby the longitudinal alignment of said first and second tubular members is enhanced.

13. The adjustment tool of claim 12 wherein said guide rod is externally threaded and said first end of said second tubular member includes an internally threaded sleeve member fixedly secured therein and threadably receiving therein said threaded guide rod whereby rotation of said second tubular member relative to said first tubular member effects change in the extent of insertion of said second tubular member into said first tubular member.

14. The adjustment tool of claim 9 wherein said means for releasably affixing said second end of said bar to the fixed location includes a further clamp post having first and second ends and a longitudinal axis, said first end of said further clamp post being releasably secured to said fixed location with its longitudinal axis extending in alignment with said longitudinal axis of said first hollow tubular member, and means releasably securing said second end of said further clamp post to said first ends of said first tubular member.

15. The adjustment tool of claim 14 and including an elongated tubular extension member having first and second ends and interposed between said second end of said further clamp and said first end of said first tubular member.

16. The adjustment tool of claim 15 and including lock nut means releasably joining one end of said extension member to said second end of said further clamp post and further lock nut means releasably joining said second end of said extension member to said first end of said first tubular member, whereby said lock nuts are deployable to interlock said first tubular member with said further clamp post to delimit rotation between said clamp post and said first tubular members.

17. The alignment tool of claim 9 wherein said indicia include first and second sets of indicia, a first set comprising a plurality of circumferential markings disposed at equally spaced apart distances along the length dimension of said second tubular member and a second set comprising a plurality of markings disposed at respective equally spaced apart locations about the outer circumference of said second end of said first hollow tubular member, and a straight line mark disposed on the outer circumference of said second tubular member which is aligned parallel to said longitudinal axis of said second tubular member, said circumferential markings being disposed in respective planes which are perpendicular to said straight line mark.

* * * * *